United States Patent
Ban

(10) Patent No.: US 11,722,618 B2
(45) Date of Patent: Aug. 8, 2023

(54) SYSTEM FOR IMAGE FORMING APPARATUS

(71) Applicant: BROTHER KOGYO KABUSHIKI KAISHA, Nagoya (JP)

(72) Inventor: Ryoji Ban, Ama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/537,356

(22) Filed: Nov. 29, 2021

(65) Prior Publication Data

US 2022/0174171 A1    Jun. 2, 2022

(30) Foreign Application Priority Data

Nov. 30, 2020 (JP) ................................. 2020-198809

(51) Int. Cl.
 *H04N 1/00* (2006.01)

(52) U.S. Cl.
 CPC ..... *H04N 1/00938* (2013.01); *H04N 1/00307* (2013.01); *H04N 1/00424* (2013.01)

(58) Field of Classification Search
 CPC ........... H04N 1/00938; H04N 1/00307; H04N 1/00424
 See application file for complete search history.

(56) References Cited

U.S. PATENT DOCUMENTS

| | | | |
|---|---|---|---|
| 2011/0153729 A1* | 6/2011 | Kawai | H04N 1/00464 709/203 |
| 2013/0212464 A1* | 8/2013 | Kimura | G06F 3/1206 715/234 |
| 2013/0283262 A1* | 10/2013 | Rehtijarvi | G06Q 20/322 717/178 |
| 2015/0189025 A1* | 7/2015 | Banno | G06F 3/1236 709/224 |
| 2015/0358761 A1 | 12/2015 | Ito | |
| 2016/0162224 A1 | 6/2016 | Sato | |
| 2022/0156864 A1* | 5/2022 | Furman | H04W 4/80 |

FOREIGN PATENT DOCUMENTS

JP   2015-230539 A   12/2015
JP   2016-111486 A    6/2016

* cited by examiner

*Primary Examiner* — Juan M Guillermety
(74) *Attorney, Agent, or Firm* — Kenealy Vaidya LLP

(57) ABSTRACT

An image forming apparatus includes a controller configured to provide a mobile terminal with download information, the download information being necessary information for causing the mobile terminal to download a first application into the mobile terminal and start up the first application in the mobile terminal, the first application being executed by the mobile terminal to send an instruction to the image forming apparatus, the first application being a part of a second application, the second application being operable as an independent application in the mobile terminal by being installed into the mobile terminal, and the first application being operable in the mobile terminal without being installed in the mobile terminal.

18 Claims, 8 Drawing Sheets

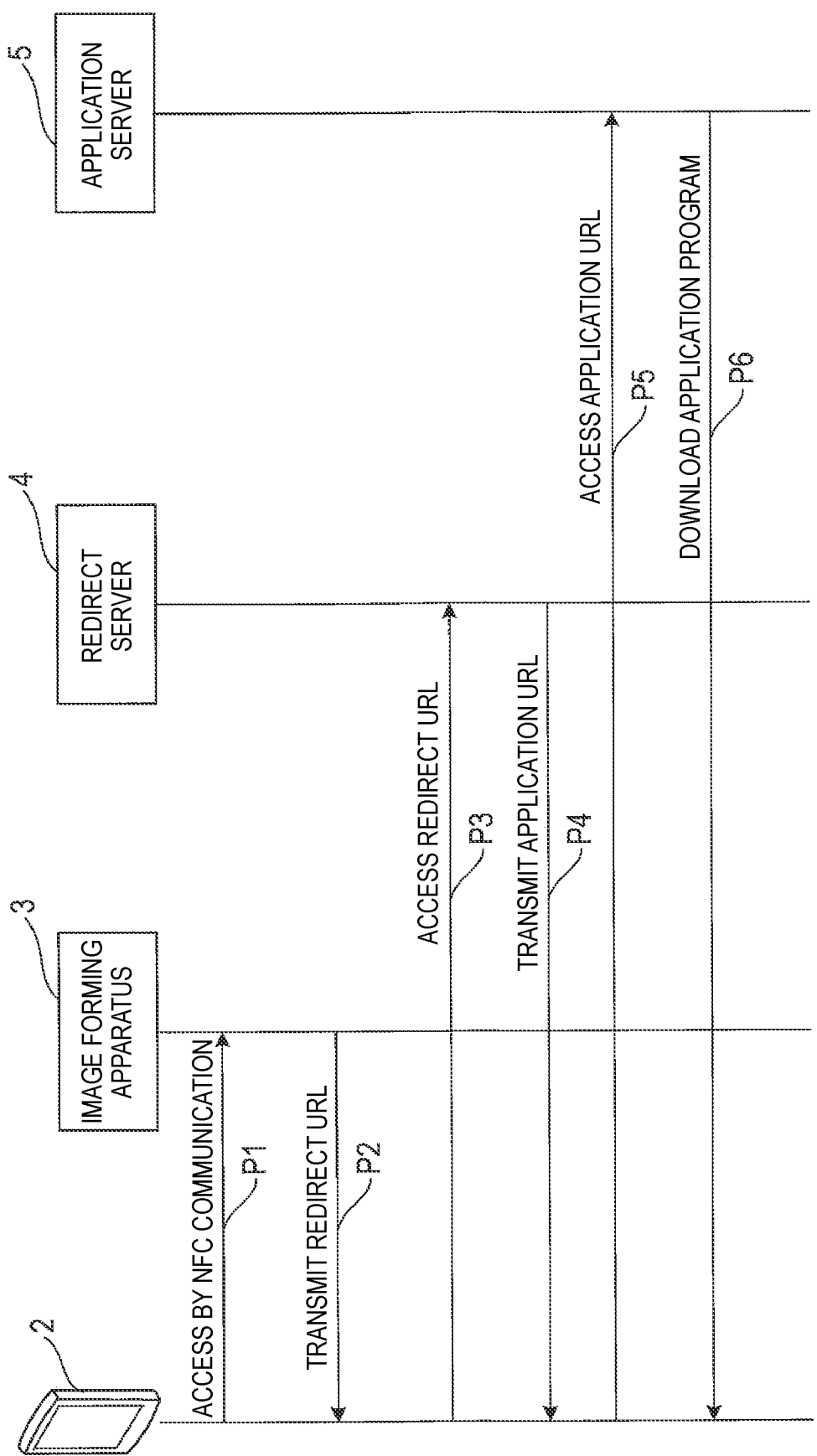

SYSTEM FOR IMAGE FORMING APPARATUS

CROSS-REFERENCE TO RELATED APPLICATIONS

This application is based on and claims priority under 35 USC 119 from Japanese Patent Application No. 2020-198809 filed on Nov. 30, 2020, the contents of which are incorporated herein by reference.

TECHNICAL FIELD

The present disclosure relates to technology of downloading an application into a mobile terminal to use an image forming apparatus.

BACKGROUND

A related art discloses that when a mobile terminal is brought close to an image forming apparatus, the image forming apparatus transmits application information to the mobile terminal. The mobile terminal receiving the application information displays a download site of an application indicated by the application information, and induces a user to install the application. Then, the mobile terminal downloads and installs the application according to an operation of the user.

SUMMARY

One illustrative aspect of the present disclosure provides an image forming apparatus including a controller. The controller is configured to provide a mobile terminal with download information, the download information being necessary information for causing the mobile terminal to download a first application into the mobile terminal and start up the first application in the mobile terminal, the first application being executed by the mobile terminal to send an instruction to the image forming apparatus, the first application being a part of a second application, the second application being operable as an independent application in the mobile terminal by being installed into the mobile terminal, and the first application being operable in the mobile terminal without being installed in the mobile terminal.

According thereto, it is possible to cause the image forming apparatus to execute image printing by an instruction from the mobile terminal without installing the first application in the mobile terminal. Therefore, it is possible to improve convenience when downloading an application into the mobile terminal to use the image forming apparatus.

Another illustrative aspect of the present disclosure provides an image forming apparatus including a controller. The controller is configured to provide a mobile terminal with first URL information indicating a URL for accessing a first external apparatus equipped outside the image forming apparatus as download information, the download information being necessary to download a first application into the mobile terminal and start up the first application in the mobile terminal, the first application being executed in the mobile terminal so as for causing the mobile terminal to instruct the image forming apparatus, in which the mobile terminal is configured to: access the first external apparatus based on the first URL information; obtain second URL information indicating of a URL for accessing a second external apparatus equipped outside the image forming apparatus from the first external apparatus; access the second external apparatus based on the second URL information; and download the first application from the second external apparatus.

According thereto, when the first application is changed, it is possible to deal with the change by changing the second URL information that is transmitted from the first external apparatus, without changing the first URL information that is transmitted from the image forming apparatus. Specifically, according to the image forming apparatus of the present disclosure, for example, in a case where the first application is changed, when an operation of changing the second URL information is performed on the one first external apparatus, it is possible to eliminate an operation of changing the first URL information for each of a plurality of image forming apparatuses. Thereby, the image forming apparatus of the present disclosure can improve convenience when downloading an application into the mobile terminal to use the image forming apparatus.

BRIEF DESCRIPTION OF DRAWINGS

Illustrative embodiments of the disclosure will be described in detail based on the following figures, wherein:

FIG. 8 is a sequence diagram showing a specific example of operations of the image forming system.

DETAILED DESCRIPTION

In the related art, when causing the image forming apparatus to execute image printing by an instruction from the mobile terminal, it is necessary to download and install an application corresponding to the image forming apparatus into the mobile terminal. For this reason, for example, a time consumed after the user intends to cause the image forming apparatus to execute image printing until the image printing is completed is prolonged, which may deteriorate convenience of the image forming apparatus.

Therefore, the present disclosure improves convenience when downloading an application into a mobile terminal to use an image forming apparatus.

Hereinafter, an illustrative embodiment of the present disclosure will be described with reference to the drawings.

(1) Configuration of Image Forming System 1

Figure 1:
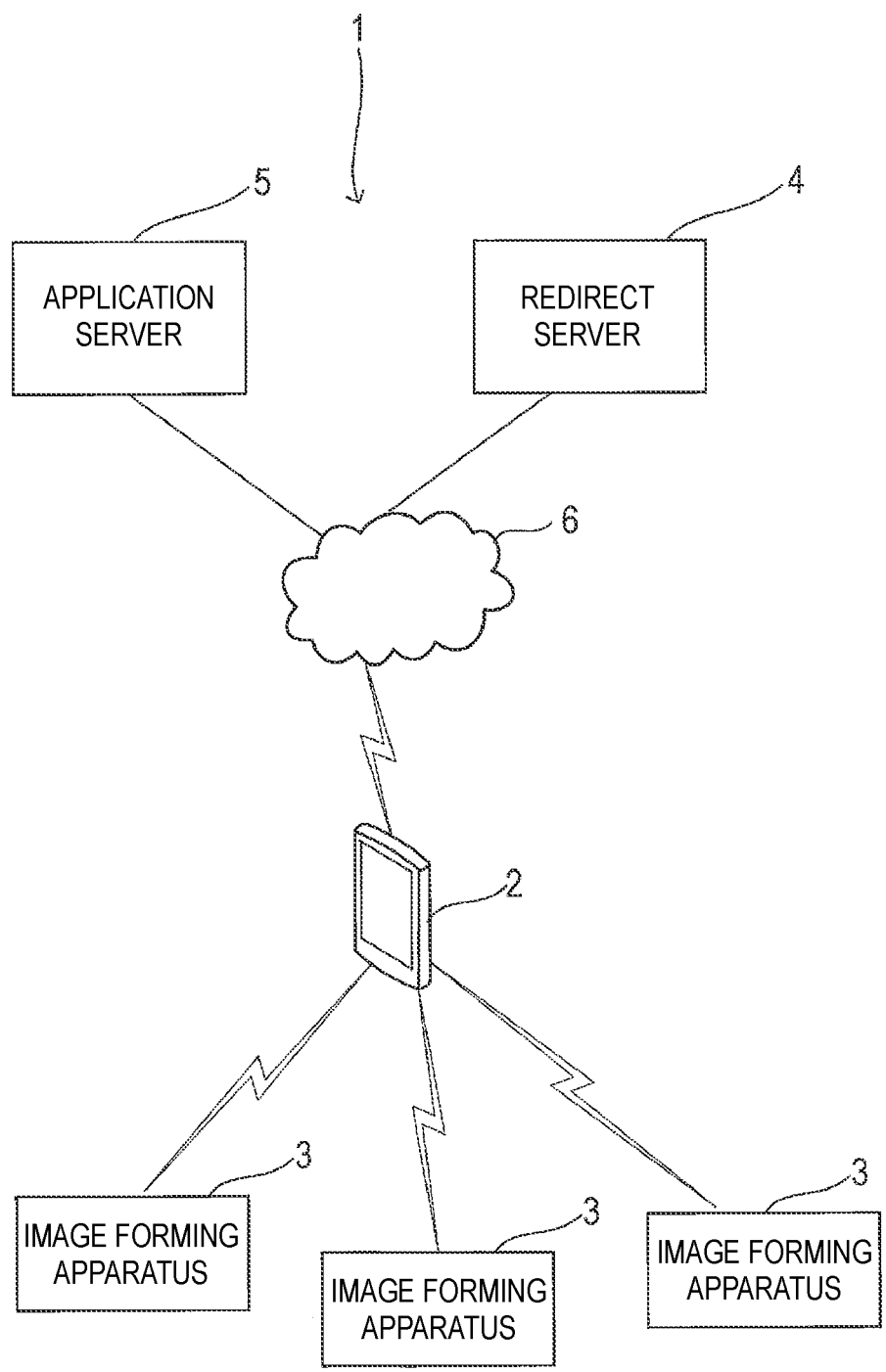
FIG. 1 is a block diagram showing a configuration of an image forming system.

As shown in FIG. 1, an image forming system 1 of the present illustrative embodiment includes a plurality of mobile terminals 2, a plurality of image forming apparatuses 3, a redirect server 4 and an application server 5. In FIG. 1, for simple illustration, one mobile terminal 2 is shown.

The mobile terminal 2, the redirect server 4 and the application server 5 are configured to communicate with each other via a WAN 6. WAN is an abbreviation of Wide Area Network. In the present illustrative embodiment, the WAN 6 is the Internet.

The mobile terminal 2 and the image forming apparatus 3 are configured to communicate with each other according to wireless LAN or short-range wireless communication conforming to Bluetooth standards (hereinafter, referred to as BT wireless communication). LAN is an abbreviation of Local Area Network. Bluetooth is a registered trademark.

The mobile terminal 2 is allotted to each operator who performs an operation using the image forming apparatus 3, and is carried by the operator.

Figure 2:
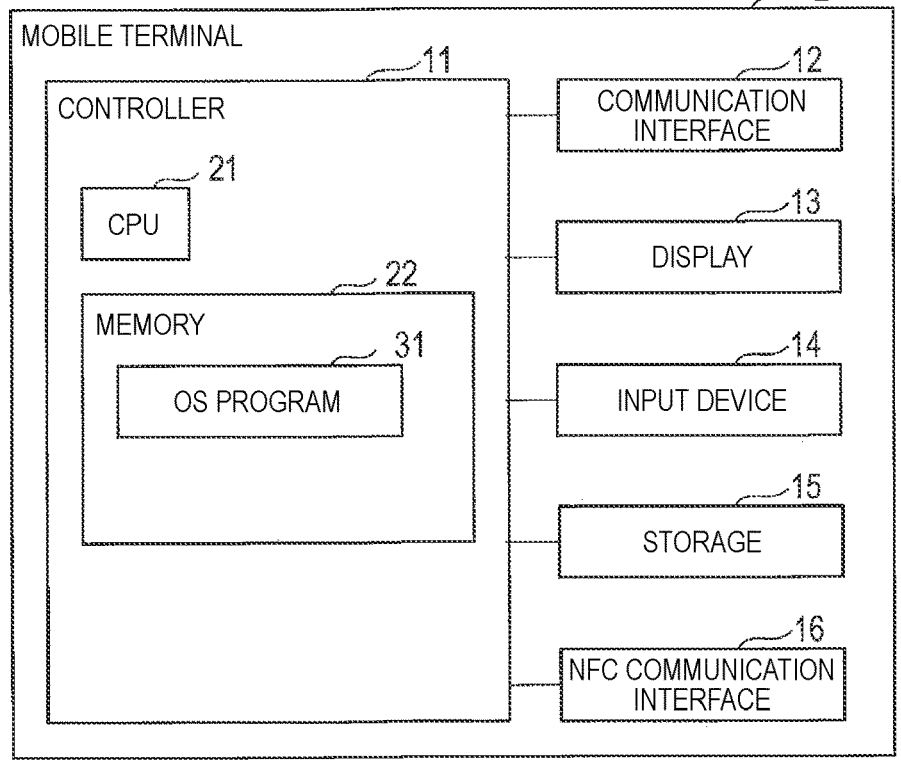
FIG. 2 is a block diagram showing configurations of a mobile terminal and an image forming apparatus.
Figure 2:
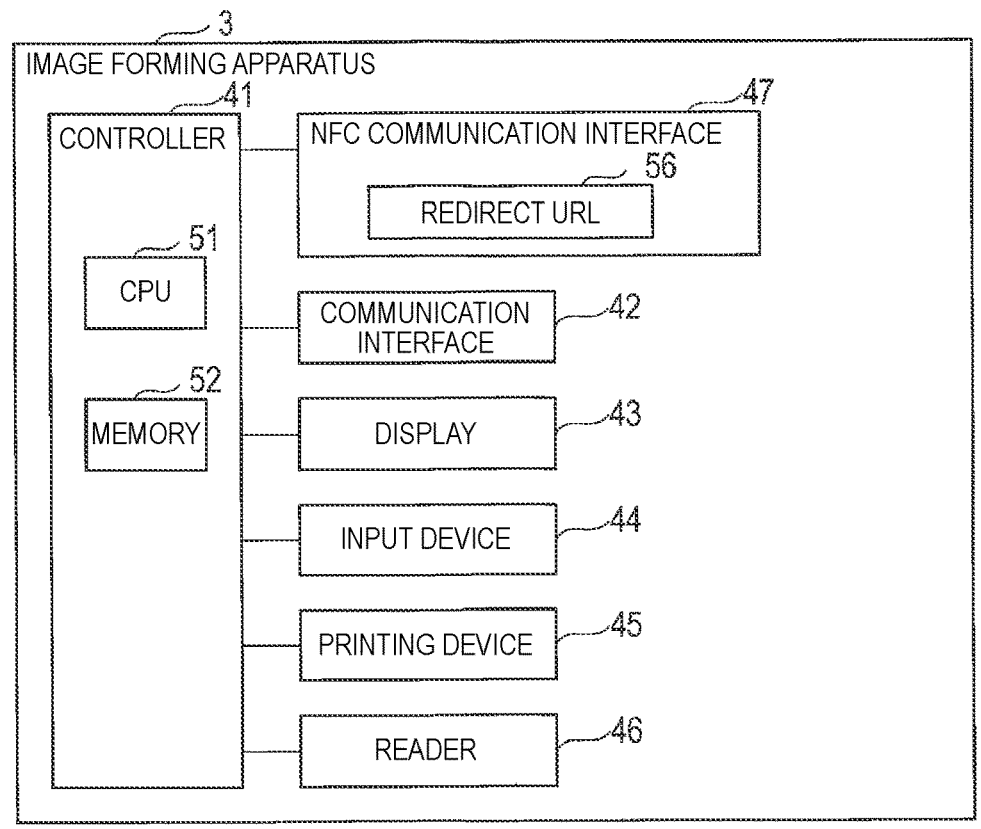

As shown in FIG. 2, the mobile terminal 2 includes a controller 11, a communication interface 12, a display 13, an input device 14, a storage 15, and an NFC communication interface 16. NFC is an abbreviation of Near Field Communication.

The controller 11 includes a CPU (abbreviation of Central Processing Unit) 21 and a memory 22. The CPU 21 is configured to execute a program stored in the memory 22, thereby implement a variety of functions of the mobile terminal 2. Note that, a variety of functions implemented by the controller 11 are not limited to the configuration where they are implemented by the execution of the program. For example, some or all of the functions may also be implemented using one or more hardware.

The memory 22 includes a semiconductor memory (for example, a ROM, a RAM, and a flash memory) that is a non-transitory tangible recording medium. ROM is an abbreviation of Read Only Memory. RAM is an abbreviation of Random Access Memory. The memory 22 stores an operating system (hereinafter, referred to as 'OS') program 31. The OS program 31 is a program for providing basic functions of the mobile terminal 2.

The communication interface 12 is configured to perform data communication with the redirect server 4 and the application server 5 via the WAN 6. The communication interface 12 is also configured to perform data communication with the image forming apparatus 3 via wireless LAN or BT wireless communication.

The display 13 includes a display device (not shown), and is configured to display diverse images on the display device. The input device 14 includes a touch panel provided on a display screen of the display 13, and a switch provided at the periphery of the display screen of the display 13. The input device 14 is configured to output input operation information for specifying an input operation performed via the touch panel and the switch by the operator. The storage 15 includes an auxiliary storage device such as an HDD and an SSD, for example, and stores a variety of data. HDD is an abbreviation of Hard Disk Drive. SSD is an abbreviation of Solid State Drive.

The NFC communication interface 16 is configured to perform data communication with the image forming apparatus 3 via short-range wireless communication conforming to NFC communication standards (hereinafter, referred to as 'NFC wireless communication').

The image forming apparatus 3 includes a controller 41, a communication interface 42, a display 43, an input device 44, a printing device 45, a reader 46 and an NFC communication interface 47.

The controller 41 includes a CPU 51 and a memory 52. The CPU 51 is configured to execute a program stored in the memory 52, thereby implement a variety of functions of the image forming apparatus 3. Note that, a variety of functions implemented by the controller 41 are not limited to the configuration where they are implemented by the execution of the program. For example, some or all of the functions may also be implemented using one or more hardware. The memory 52 includes a semiconductor memory (for example, a ROM, a RAM, and a flash memory) that is a non-transitory tangible recording medium, and stores programs and data.

The communication interface 42 is configured to perform data communication with the mobile terminal 2 via wireless LAN or BT wireless communication.

The display 43 includes a display device (not shown), and is configured to display diverse images on the display device. The input device 44 includes a touch panel provided on a display screen of the display 43, and a switch provided at the periphery of the display screen of the display 43. The input device 44 is configured to output input operation information for specifying an input operation performed via the touch panel and the switch by the operator.

The printing device 45 includes a printing mechanism of inkjet technology or electrophotographic technology, and can print an image on a printing medium. The reader 46 includes an image sensor, and is configured to read an image recorded on a document and to generate image data indicative of the read image.

The NFC communication interface 47 is configured to perform data communication with the mobile terminal 2 via NFC wireless communication. The NFC communication interface 47 stores a redirect URL 56, which will be described later.

Figure 3:
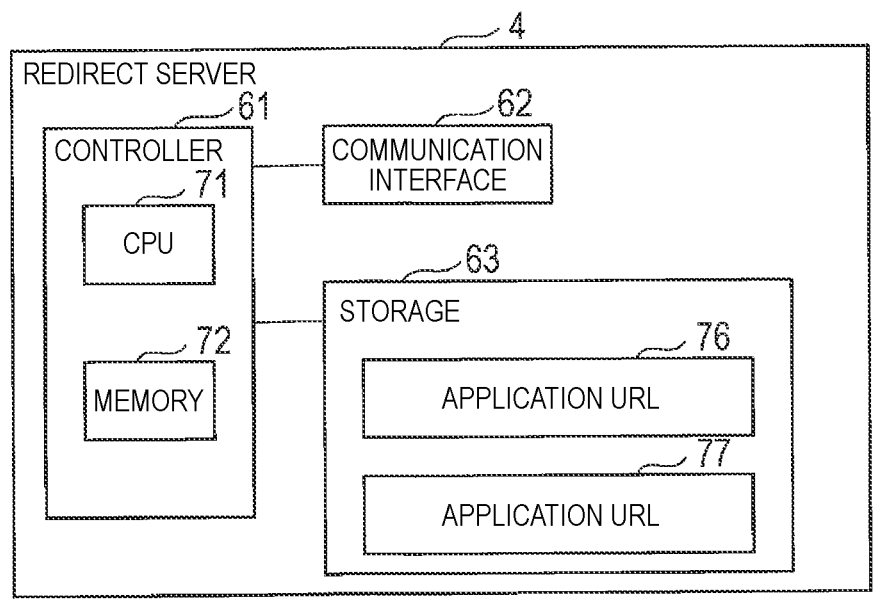
FIG. 3 is a block diagram showing configurations of a redirect server and an application server.
Figure 3:
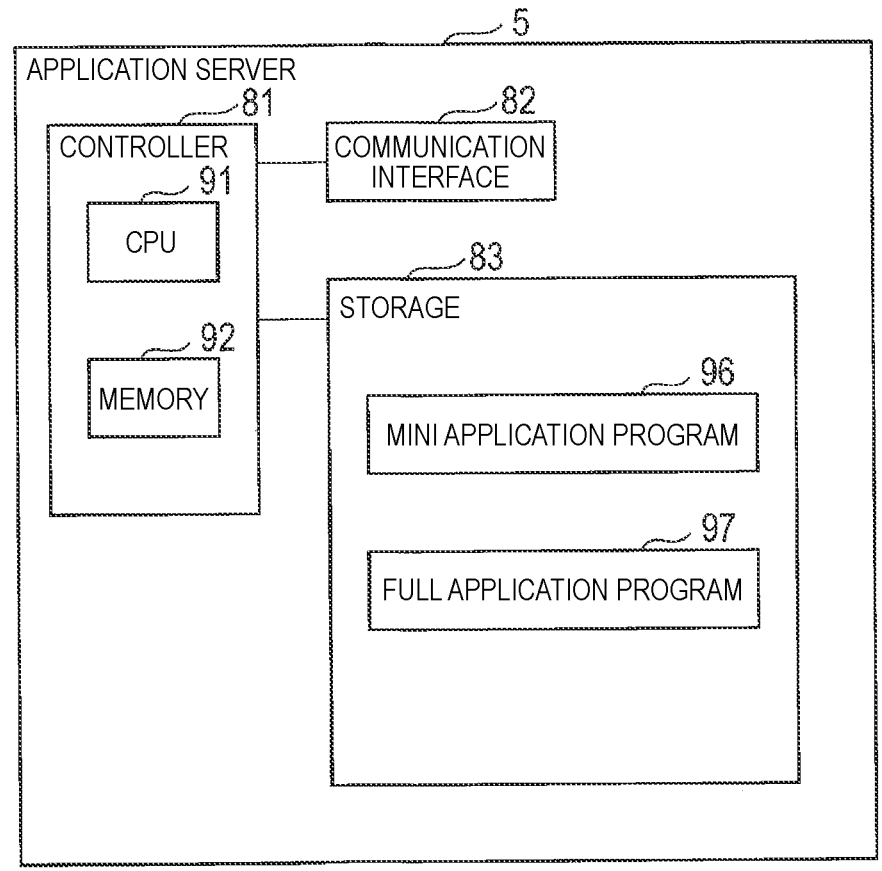

As shown in FIG. 3, the redirect server 4 includes a controller 61, a communication interface 62 and a storage 63.

The controller 61 includes a CPU 71 and a memory 72. The CPU 71 is configured to execute a program stored in the memory 72, thereby implement a variety of functions of the redirect server 4. Note that, a variety of functions implemented by the controller 61 are not limited to the configuration where they are implemented by the execution of the program. For example, some or all of the functions may also be implemented using one or more hardware. The memory 72 includes a semiconductor memory (for example, a ROM, a RAM, and a flash memory) that is a non-transitory tangible recording medium, and stores programs and data.

The communication interface 62 is configured to perform data communication with the mobile terminal 2 via the WAN 6. The storage 63 includes an auxiliary storage device such as an HDD and an SSD, for example, and stores a variety of data. The storage 63 stores application URLs 76 and 77, which will be described later.

The application server 5 includes a controller 81, a communication interface 82 and a storage 83.

The controller 81 includes a CPU 91 and a memory 92. The CPU 91 is configured to execute a program stored in the memory 92, thereby implement a variety of functions of the application server 5. Note that, a variety of functions implemented by the controller 81 are not limited to the configuration where they are implemented by the execution of the program. For example, some or all of the functions may also be implemented using one or more hardware. The memory 92 includes a semiconductor memory (for example, a ROM, a RAM, and a flash memory) that is a non-transitory tangible recording medium, and stores programs and data.

The communication interface 82 is configured to perform data communication with the mobile terminal 2 via the WAN 6. The storage 83 includes an auxiliary storage device such as an HDD and an SSD, for example, and stores a variety of data. The storage 83 stores a mini application program 96 and a full application program 97, which will be described later.

(2) Processing Executed in Image Forming Apparatus 3

Subsequently, a sequence of redirect URL transmission processing executed by the CPU 51 of the image forming apparatus 3 is described. The redirect URL transmission processing is processing that is repeatedly executed during operations of the controller 41.

Figure 4:
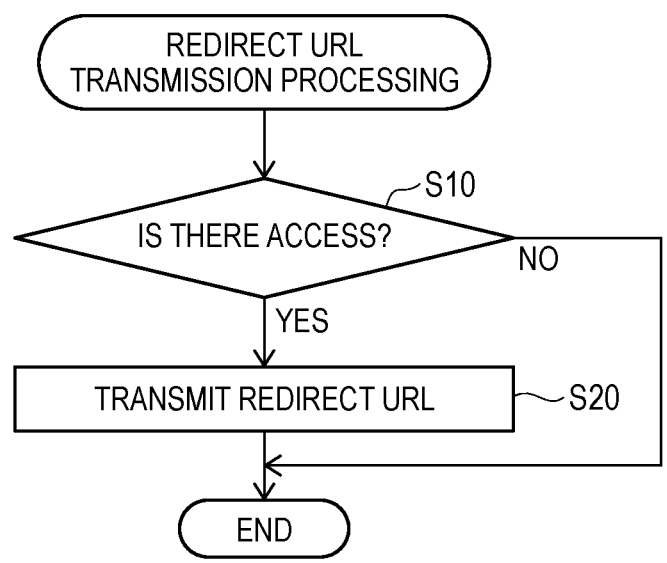
FIG. 4 is a flowchart showing redirect URL transmission processing.

When the redirect URL transmission processing is executed, the CPU 51 first determines whether there is an access from the NFC communication interface 16 of the mobile terminal 2 to the NFC communication interface 47 of the image forming apparatus 3, in S10, as shown in FIG. 4. Here, when it is determined that there is no access from the NFC communication interface 16 of the mobile terminal 2, the CPU 51 ends the redirect URL transmission processing.

On the other hand, when it is determined that there is an access from the NFC communication interface 16 of the mobile terminal 2, the CPU 51 transmits the redirect URL 56 from the NEC communication interface 47 to the NFC communication interface 16 of the mobile terminal 2, in S20, and ends the redirect URL transmission processing. URL is an abbreviation of Uniform Resource Locator. In the present illustrative embodiment, the redirect URL 56 is, for example, 'https://server.com/launch?XXXX'. 'XXXX' in the redirect URL 56 is identification information of the image forming apparatus 3, and in the present illustrative embodiment, is a MAC address of the image forming apparatus 3. The MAC address is an abbreviation of Media Access Control address.

(3) Processing Executed in Mobile Terminal 2

Subsequently, a sequence of application start-up processing executed by the CPU 21 of the mobile terminal 2 is described. The application start-up processing is processing that is repeatedly executed during operations of the controller 11.

Figure 5:
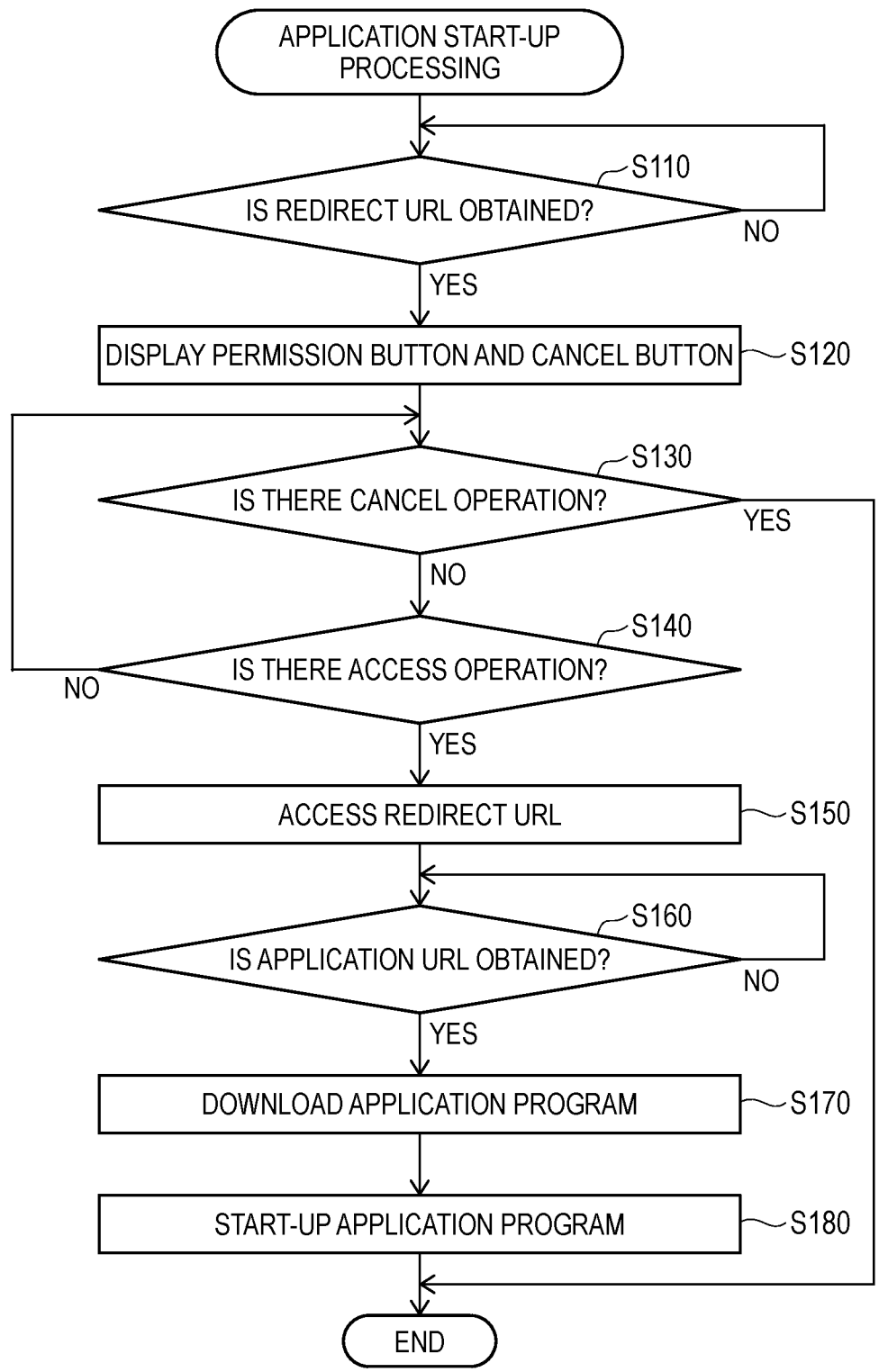
FIG. 5 is a flowchart showing application start-up processing.

When the application start-up processing is executed, as shown in FIG. 5, the CPU 21 first determines whether the redirect URL is obtained from the image forming apparatus 3, in S110. Here, when it is determined that the redirect URL is not obtained, the CPU 21 repeats the processing of S110 and stands by until the redirect URL 56 is obtained.

When the redirect URL 56 is obtained, the CPU 21 displays, on a display screen of the display 13, a permission button and a cancel button, in S120.

Then, the CPU 21 determines in S130 whether a cancel operation has been performed. Specifically, the CPU 21 determines whether an operation of tapping the cancel button has been performed. Here, when it is determined that the cancel operation has been performed, the CPU 21 ends the application start-up processing.

On the other hand, when it is determined that the cancel operation has not been performed, the CPU 21 determines whether an access operation has been performed, in S140. Specifically, the CPU 21 determines whether an operation of tapping the permission button has been performed. Here, when it is determined that the access operation has not been performed, the CPU 21 proceeds to S130. On the other hand, when it is determined that the access operation has been performed, the CPU 21 accesses the obtained redirect URL 56, in S150.

Then, in S160, the CPU 21 determines whether the application URL 76 is obtained from the redirect server 4. Here, when it is determined that the application URL 76 is not obtained, the CPU 21 repeats the processing of S160 and stands by until the application URL 76 is obtained. In the present illustrative embodiment, the application URL 76 is, for example, 'https://appclip.com/launch?XXXX'. 'XXXX' in the application URL 76 is the identification information of the image forming apparatus 3, similar to the redirect URL 56, and in the present illustrative embodiment, is a MAC address of the image forming apparatus 3.

When the application URL 76 is obtained, the CPU 21 accesses the application URL 76 and downloads a mini application program 96 specified by the application URL 76 from the application server 5, in S170.

Note that, an application executed by the mini application program 96 downloaded in S170 is a part of a full application that is installed in the mobile terminal 2 and thus can operate as an independent application in the mobile terminal 2, and is a mini application that can operate in the mobile terminal 2 without being installed in the mobile terminal 2. Note that, the mini application is App Clip when an OS mounted in the mobile terminal 2 is iOS, and is Instant Apps when the OS mounted in the mobile terminal 2 is Android. iOS is a registered trademark. Android is a registered trademark.

The mini application has at least a function of causing the image forming apparatus 3 communicable with the mobile terminal 2 to print image data stored in the mobile terminal 2 or image data prepared in the mobile terminal 2.

When the download of the mini application program 96 is over, the CPU 21 starts up the downloaded mini application program 96 in S180, and ends the application start-up processing.

(4) Processing Executed in Redirect Server 4

Subsequently, a sequence of application URL transmission processing executed by the CPU 71 of the redirect server 4 is described. The application URL transmission processing is processing that is repeatedly executed during operations of the controller 61.

Figure 6:
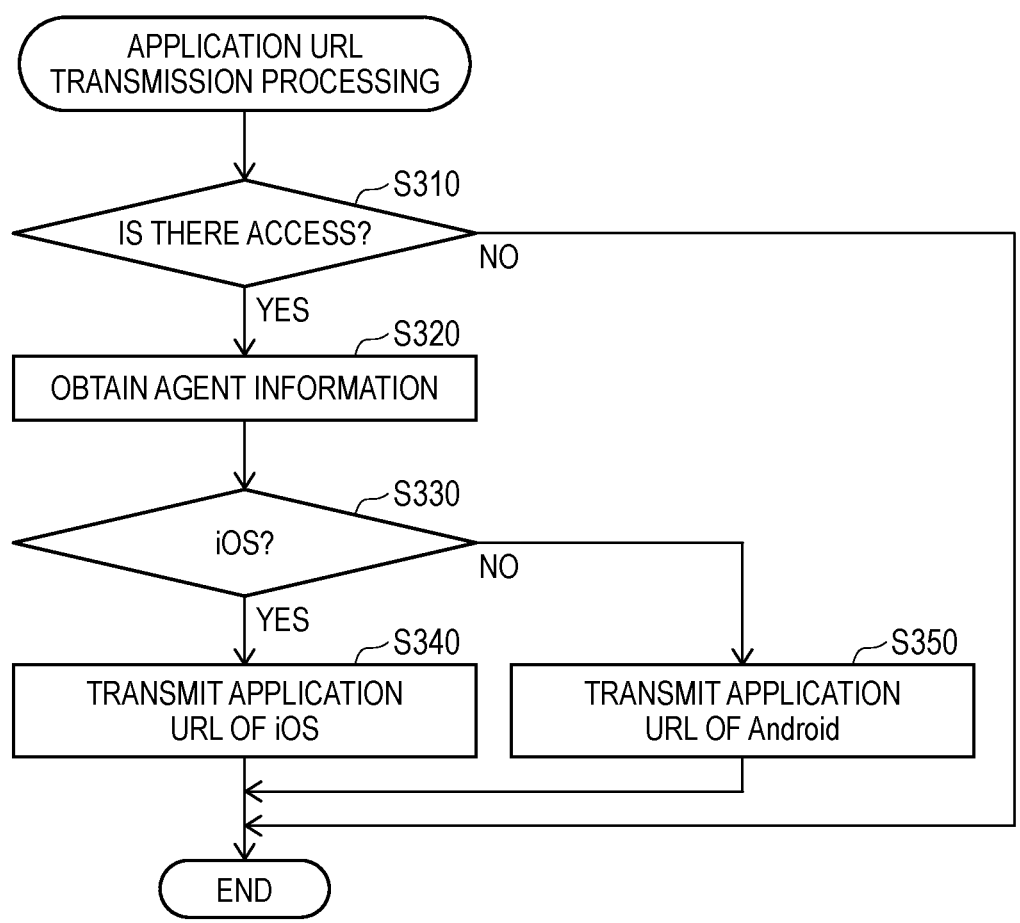
FIG. 6 is a flowchart showing application URL transmission processing.

When the application URL transmission processing is executed, the CPU 71 first determines whether there is an access from the communication interface 12 of the mobile terminal 2 to the communication interface 62 of the redirect server 4, in S310, as shown in FIG. 6. Here, when it is determined that there is no access from the communication interface 12 of the mobile terminal 2, the CPU 71 ends the application URL transmission processing.

On the other hand, when it is determined that there is an access from the communication interface 12 of the mobile terminal 2, the CPU 71 obtains agent information from the accessed mobile terminal 2, in S320. The agent information includes information indicative of a type (i.e., iOS or Android) of the OS mounted in the mobile terminal 2.

Then, in S330, the CPU 71 determines whether the OS of the accessed mobile terminal 2 is iOS or not, based on the obtained agent information.

Here, when it is determined that the OS is iOS, the CPU 71 transmits the application URL 76 corresponding to iOS to the accessed mobile terminal 2 in S340, and ends the application URL transmission processing. The application URL 76 corresponding to iOS is, for example, 'https://appclip.com/launch?XXXX', in the present illustrative embodiment.

On the other hand, when it is determined that the OS is not iOS, the CPU 71 determines that the OS is Android, transmits the application URL 77 corresponding to Android to the accessed mobile terminal 2 in S350, and ends the application URL transmission processing.

(5) Processing Executed in Application Program

Subsequently, a procedure of connection processing executed by the mini application program 96 started up in S180 is described. The connection processing is processing that is started by the startup of mini application program 96 in S180.

Figure 7:
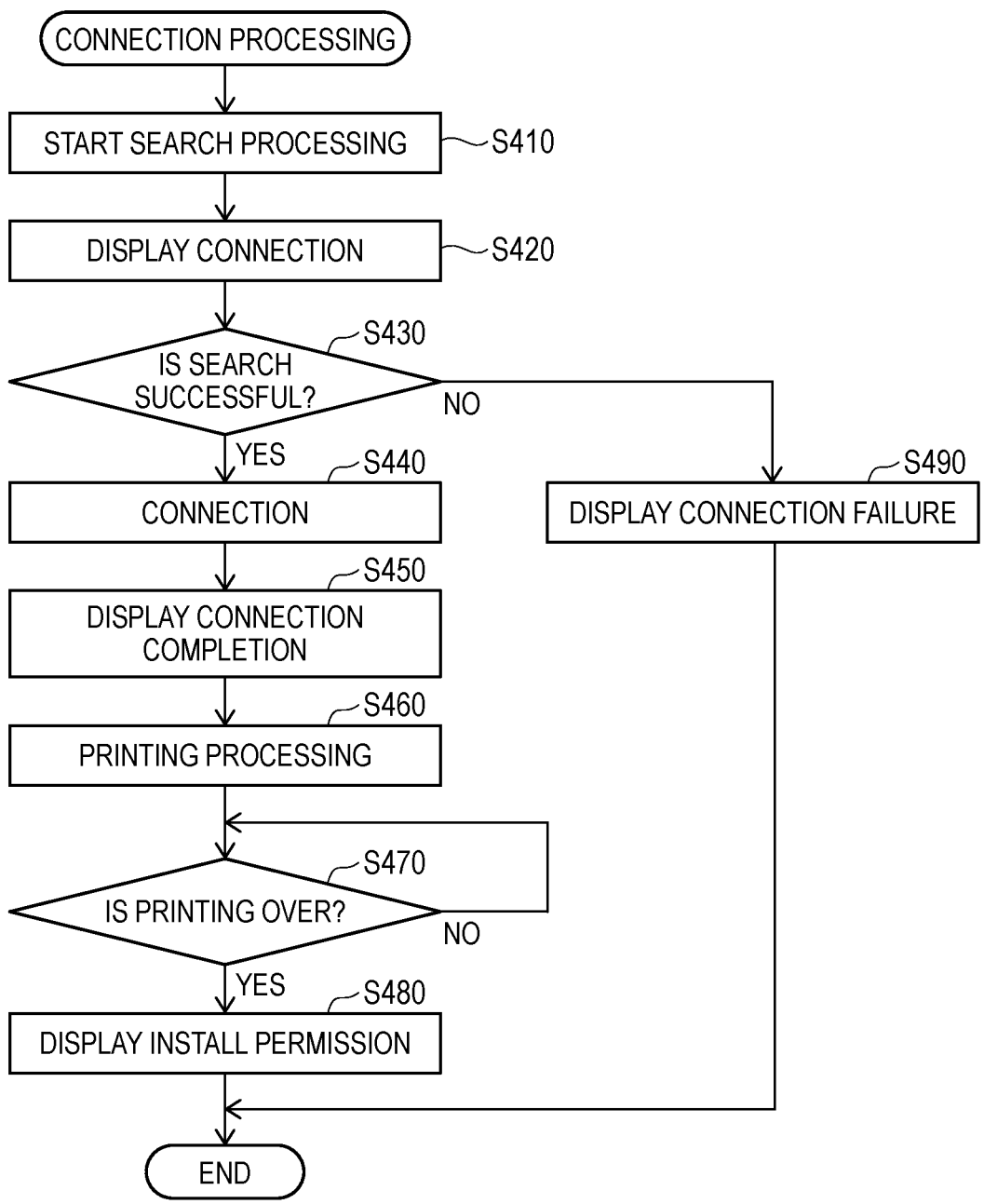
FIG. 7 is a flowchart showing connection processing.

When the connection processing is executed, as shown in FIG. 7, the CPU 21 first starts apparatus search processing of searching for the image forming apparatus 3 that can be connected by wireless communication (i.e., wireless LAN or BT wireless communication) via the communication interface 12, in S410. Note that, when the identification information (i.e., 'XXXX' in 'https://server.com/launch?XXXX') in the redirect URL 56 is identification information that is used in wireless LAN, the CPU 21 searches for the image forming apparatus 3 that can be connected by wireless LAN. On the other hand, when the identification information in the redirect URL 56 is identification information that is used in BT wireless communication, the CPU 21 searches for the image forming apparatus 3 that can be connected by BT wireless communication.

In S420, the CPU 21 displays a connection image, which indicates that connection is being executed, on the display screen of the display 13. Note that, when searching for the image forming apparatus 3 that can be connected by wireless LAN, the CPU 21 displays a connection image, which indicates that connection by wireless LAN is being executed. On the other hand, when searching for the image forming apparatus 3 that can be connected by BT wireless communication, the CPU 21 displays a connection image, which indicates that connection by BT wireless communication is being executed.

Then, the CPU 21 determines in S430 whether the search is successful. Specifically, the CPU 21 determines whether the one or more searched image forming apparatuses 3 include the image forming apparatus 3 corresponding to the identification information in the redirect URL 56. When it is determined that the image forming apparatus 3 corresponding to the identification information in the redirect URL 56 is included, the CPU 21 determines that the search is successful.

Here, when the search is successful, the CPU 21 connects to the image forming apparatus 3 corresponding to the identification information in the redirect URL 56 by wireless communication via the communication interface 12, in S440.

In S450, the CPU 21 also displays a connection completion image, which indicates that connection to the image forming apparatus 3 is completed, on the display screen of the display 13.

Then, in S460, the CPU 21 executes printing processing. Specifically, the CPU 21 first displays a print setting selection image for selecting a print setting on the display screen of the display 13. The print setting selection image is configured so that one print setting can be selected from a plurality of displayed print settings, based on the input operation performed via the touch panel and the switch by the operator.

When the print setting is selected, the CPU 21 displays a print target selection image for selecting image data, which is a print target, on the display screen of the display 13. The print target selection image is configured so that one image data can be selected from one or more displayed image data, based on the input operation performed via the touch panel and the switch by the operator.

When the image data is selected, the CPU 21 transmits a print instruction for printing the selected image data with the selected print setting to the connected image forming apparatus 3, and ends the printing processing.

The CPU 21 determines in S470 whether the printing by the image forming apparatus 3 is over. Specifically, the CPU 21 determines that the printing is over, in a case where a print completion notification is received from the image forming apparatus 3.

Here, when the printing by the image forming apparatus 3 is not over, the CPU 21 repeats the processing of S470 and stands by until the printing by the image forming apparatus 3 is over. When the printing by the image forming apparatus 3 is over, the CPU 21 displays an install-possible image, which indicates that the full application can be installed, in S480, and ends the connection processing.

Thereafter, when the full application program 97 is downloaded and installed, the full application is started up and executed in next or subsequent times. On the other hand, when the full application program 97 is not installed, the mini application program 96 is downloaded and started up even in next or subsequent times.

When it is determined in S430 that the search is not successful, the CPU 21 displays a connection failure image, which indicates that connection with the image forming apparatus 3 has failed, on the display screen of the display 13 in S490, and ends the connection processing. Note that, the connection failure image includes a message to urge consideration of connection with the image forming apparatus 3 other than the image forming apparatus 3 with which connection has failed.

Note that, the processing of S410 to S460 and S490 in the connection processing shown in FIG. 7 is common to the mini application and the full application.

(6) Operation Example of Image Forming System 1

Subsequently, a specific example of operations of the image forming system 1 is described.

When the operator who carries the mobile terminal 2 brings the mobile terminal 2 close to the image forming apparatus 3, the mobile terminal 2 accesses the image forming apparatus 3 by NFC wireless communication, as shown with processing P1 in FIG. 8.

When the access from the mobile terminal 2 is detected, the image forming apparatus 3 transmits the redirect URL 56 to the mobile terminal 2, as shown with processing P2.

As shown with processing P3, the mobile terminal 2 receiving the redirect URL 56 accesses the redirect server 4 corresponding to the redirect URL 56.

When the access from the mobile terminal 2 is detected, the redirect server 4 transmits the application URL 76 to the mobile terminal 2, as shown with processing P4.

As shown with processing P5, the mobile terminal 2 receiving the application URL 76 accesses the application server 5 corresponding to the application URL 76. Then, the mobile terminal 2 downloads the mini application program 96 from the application server 5, as shown with processing P6.

When the download of the mini application program 96 is over, the mobile terminal 2 starts up the downloaded mini application program 96.

(7) Effects

The image forming apparatus 3 of the image forming system 1 configured in this way provides the mobile terminal 2 with the redirect URL 56 necessary to download the mini application, which is executed in the mobile terminal 2 so as for the mobile terminal 2 to instruct the image forming apparatus 3, into the mobile terminal 2 and to start up the mini application in the mobile terminal 2.

The mini application is a part of the full application that can operate as an independent application in the mobile terminal 2 by being installed in the mobile terminal, and is an application that can operate in the mobile terminal 2 without being installed in the mobile terminal 2.

In this way, according to the image forming apparatus 3, it is possible to cause the image forming apparatus 3 to execute image printing by an instruction from the mobile terminal 2 without installing the mini application in the mobile terminal 2. Therefore, it is possible to improve convenience when downloading an application into the mobile terminal 2 to use the image forming apparatus 3.

In addition, in order to issue instructions from the mobile terminal 2 to the image forming apparatus 3, the mini application to be executed by the mobile terminal 2 is downloaded in the mobile terminal 2. The image forming apparatus 3 provides the redirect URL 56 for accessing the redirect server 4 equipped outside the image forming apparatus 3 as download information necessary to start up the mini application in the mobile terminal 2.

The mobile terminal 2 accesses the redirect server 4 based on the redirect URL 56, thereby obtains the application URL 76 for accessing the application server 5 equipped outside the image forming apparatus 3 from the redirect server 4. The mobile terminal 2 also accesses the application server 5 based on the application URL 76, thereby downloads the mini application from the application server 5.

Accordingly, in a case where the mini application is changed, the image forming apparatus 3 can deal with the change by changing the application URLs 76 and 77 transmitted from the redirect server 4 without changing the redirect URL 56 transmitted from the image forming apparatus 3. That is, according to the image forming apparatus 3, in a case where the mini application is changed, when an operation of changing the application URLs 76 and 77 on the one redirect server 4 is performed, it is possible to eliminate an operation of changing the redirect URL 56 for each of a plurality of the image forming apparatuses 3. Thereby, the image forming apparatus 3 can improve convenience when downloading an application into the mobile terminal 2 to use the image forming apparatus 3.

In addition, as for the application URLs 76 and 77, a plurality of URLs different from each other is set according to the OS of the mobile terminal 2. When the mobile terminal 2 accesses the redirect server 4 based on the redirect URL 56, the redirect server 4 determines whether the OS of the mobile terminal 2 is iOS or not, and when it is determined that the OS of the mobile terminal 2 is iOS, for example, the redirect server 4 transmits the application URL 76 corresponding to iOS to the mobile terminal 2. Thereby, the image forming apparatus 3 can cause the mobile terminal 2 to obtain the appropriate application URLs 76 and 77 according to the OS of the mobile terminal 2.

After starting up the mini application, the mobile terminal 2 displays the connection image for connecting to the image forming apparatus 3. Thereby, when connecting to the image forming apparatus 3, the mobile terminal 3 can enable the operator to recognize that connection to the image forming apparatus 3 is being executed. Note that, after starting up the full application, the connection image is not displayed, and for example, a function selection image for selecting a function such as 'print', 'scan' and 'fax' is displayed. For example, when the operator selects a 'connection' function on the function selection image, the mobile terminal 2 displays the connection image, and starts the connection processing, similar to the case where the mini application is started up.

The redirect URL 56 includes the MAC address of the image forming apparatus 3, and the connection image is an image for connecting to the image forming apparatus 3 corresponding to the MAC address. Thereby, the mobile terminal 2 can connect to the image forming apparatus 3 by an appropriate method (i.e., wireless LAN) corresponding to the MAC address.

As for the connection image, a plurality of images different from each other is set according to the type of the communication interface (i.e., an interface of wireless LAN or an interface of BT wireless communication).

When the identification information in the redirect URL 56 is identification information that is used for the interface of wireless LAN, the mobile terminal 2 displays a connection image for connecting to the image forming apparatus 3 via wireless LAN, and when the identification information in the redirect URL 56 is identification information that is used for the interface of BT wireless communication, the mobile terminal 2 displays a connection image for connecting to the image forming apparatus 3 via the interface of BT wireless communication. Thereby, the mobile terminal 2 can connect to the image forming apparatus 3 by an appropriate method corresponding to the type of the communication interface.

When the mobile terminal 2 cannot connect to the image forming apparatus 3 corresponding to the identification information in the redirect URL 56, the mobile terminal 2 displays the connection failure image for urging connection to the image forming apparatus 3 other than the image forming apparatus 3 corresponding to the identification information in the redirect URL 56. Thereby, the mobile terminal 2 can enable the operator to recognize that there is an option for executing image formation by the image forming apparatus 3 other than the image forming apparatus 3 corresponding to the identification information in the redirect URL 56.

After the mini application causes the image forming apparatus 3 to execute image formation, the mobile terminal 2 issues a notification for urging install of the full application. Thereby, the mobile terminal 2 can enable the operator to recognize that the full application can also be installed.

In the above illustrative embodiment, S20 corresponds to the processing as the information provision unit and the URL provision unit, the redirect URL 56 corresponds to the download information, the mini application corresponds to the first application, and the full application corresponds to the second application.

In addition, the redirect URL 56 corresponds to the first URL information, the redirect server 4 corresponds to the first external apparatus, the application URLs 76 and 77 correspond to the second URL information, and the application server 5 corresponds to the second external apparatus.

The mobile terminal 2 having iOS mounted thereon corresponds to the first type of the mobile terminal, iOS corresponds to the first operating system, the identification information (i.e., MAC address) in the redirect URL 56 corresponds to the apparatus identification information, the interface of wireless LAN corresponds to the first communication interface, and the interface of BT wireless communication corresponds to the second communication interface.

Although the illustrative embodiment of the present disclosure has been described, the present disclosure is not limited to the above illustrative embodiment and can be variously modified and implemented.

Modified Example 1

For example, in the above illustrative embodiment, the image forming apparatus 3 transmits the redirect URL 56 to the mobile terminal 2. However, a QR Code indicative of the redirect URL 56 may be displayed on the display screen of the display 43 of the image forming apparatus 3. By capturing the QR Code displayed on the image forming apparatus 3 by the mobile terminal 2, the mobile terminal 2 can obtain the redirect URL 56. QR Code is a registered trademark of DENSO WAVE INCORPORATED.

Modified Example 2

In the above illustrative embodiment, the application URLs 76 and 77 corresponding to the OS mounted on the mobile terminal 2 are transmitted. However, an application URL corresponding to a version of the OS may be transmitted.

Modified Example 3

In the above illustrative embodiment, in the printing processing of S460, the print setting selection screen is first displayed. However, the function selection image of the full application is displayed, so that a variety of functions can be selected, and a selected function may be executed.

In the above illustrative embodiment, the plurality of functions of one composition element may be implemented by the plurality of composition elements, or one function of one composition element may be implemented by the plurality of composition elements. In addition, the plurality of functions of the plurality of composition elements may be implemented by one composition element, or one function that is implemented by the plurality of composition elements may be implemented by one composition element. Further, some of the configurations of the above illustrative embodiment may be omitted. Further, at least some of the configurations of the above illustrative embodiment may be added or replaced with respect to the configurations of the other illustrative embodiments.

In addition to the image forming apparatus 3, the present disclosure can be implemented in various aspects, such as a system including the image forming apparatus 3 as a composition element, a program for causing a computer to function as the image forming apparatus 3, a non-transitory tangible recording medium such as a semiconductor memory in which the program is recorded, an information provision method, and the like.

What is claimed is:

1. An image forming apparatus comprising
a controller configured to provide a mobile terminal with download information, the download information being necessary information for causing the mobile terminal to download a first application into the mobile terminal and start up the first application in the mobile terminal, the first application being executed by the mobile terminal to send an instruction to the image forming apparatus,
the first application being a part of a second application, the second application being operable as an independent application in the mobile terminal by being installed into the mobile terminal, and
the first application being operable in the mobile terminal without being installed in the mobile terminal,
wherein the controller is configured to provide first URL information as the download information, the first URL information indicating a URL for accessing a first external apparatus equipped outside the image forming apparatus,
wherein the mobile terminal is configured to:
access the first external apparatus based on the first URL information;
obtain second URL information from the first external apparatus, the second URL information indicating a URL for accessing a second external apparatus equipped outside the image forming apparatus;
access the second external apparatus based on the second URL information; and download the first application from the second external apparatus,
wherein as for the second URL information, a plurality of the URLs different from each other is set according to a type of the mobile terminal, and
wherein based on the mobile terminal accessing the first external apparatus based on the first URL information, the first external apparatus is configured to:
determine whether the mobile terminal is a first type of a mobile terminal; and
in a case it is determined that the mobile terminal is the first type of a mobile terminal, transmit, to the mobile terminal, the second URL information indicating the URL corresponding to the first type of the mobile terminal.

2. The image forming apparatus according to claim 1, wherein the first type of the mobile terminal is a mobile terminal having a first operating system.

3. The image forming apparatus according to claim 1, wherein after starting up the first application, the mobile terminal is configured to display a connection image for connecting to the image forming apparatus.

4. The image forming apparatus according to claim 3, wherein the download information includes an apparatus identification information of the image forming apparatus, and
wherein the connection image is an image for connecting to the image forming apparatus corresponding to the apparatus identification information.

5. The image forming apparatus according to claim 4, wherein as for the connection image, a plurality of images different from each other is set according to a type of a communication interface, and
wherein the mobile terminal is configured to:
in a case the apparatus identification information is identification information that is used for a first communication interface, display a first connection image, the first connection image being for connecting to the image forming apparatus via the first communication interface; and
in a case the apparatus identification information is identification information that is used for a second communication interface, display a second connection image, the second connection image being for connecting to the image forming apparatus via the second communication interface.

6. The image forming apparatus according to claim 5, wherein in a case the mobile terminal is not able to connect to the image forming apparatus corresponding to the apparatus identification information, the mobile terminal is configured to display an image for prompting an operator to make a connection to an apparatus other than the image forming apparatus corresponding to the apparatus identification information.

7. The image forming apparatus according to claim 1, wherein the first application is App Clip or Instant Apps.

8. The image forming apparatus according to claim 1, wherein in a case the image forming apparatus is communicable, the image forming apparatus is able to execute image formation by the first application.

9. The image forming apparatus according to claim 8, wherein after the first application causes the image forming apparatus to execute the image formation, the mobile terminal is configured to issue a notification for prompting the user to install the second application.

10. An image forming apparatus comprising
a controller configured to provide a mobile terminal with first URL information indicating a URL for accessing a first external apparatus equipped outside the image forming apparatus as download information, the download information being necessary to download a first application into the mobile terminal and start up the first application in the mobile terminal, the first application being executed in the mobile terminal so as for causing the mobile terminal to instruct the image forming apparatus,
wherein the mobile terminal is configured to:
access the first external apparatus based on the first URL information;
obtain second URL information indicating of a URL for accessing a second external apparatus equipped outside the image forming apparatus from the first external apparatus;
access the second external apparatus based on the second URL information; and
download the first application from the second external apparatus,
wherein as for the second URL information, a plurality of the URLs different from each other is set according to a type of the mobile terminal, and
wherein based on the mobile terminal accessing the first external apparatus based on the first URL information, the first external apparatus is configured to:
determine whether the mobile terminal is a first type of a mobile terminal; and
in a case it is determined that the mobile terminal is the first type of a mobile terminal, transmit, to the mobile terminal, the second URL information indicating the URL corresponding to the first type of the mobile terminal.

11. The image forming apparatus according to claim 10, wherein the first type of the mobile terminal is a mobile terminal having a first operating system.

12. The image forming apparatus according to claim 10, wherein after starting up the first application, the mobile terminal is configured to display a connection image for connecting to the image forming apparatus.

13. The image forming apparatus according to claim 12, wherein the download information includes an apparatus identification information of the image forming apparatus, and
wherein the connection image is an image for connecting to the image forming apparatus corresponding to the apparatus identification information.

14. The image forming apparatus according to claim 13, wherein as for the connection image, a plurality of images different from each other is set according to a type of a communication interface, and
wherein the mobile terminal is configured to:
in a case the apparatus identification information is identification information that is used for a first communication interface, display a first connection image, the first connection image being for connecting to the image forming apparatus via the first communication interface; and
in a case the apparatus identification information is identification information that is used for a second communication interface, display a second connection image, the second connection image being for connecting to the image forming apparatus via the second communication interface.

15. The image forming apparatus according to claim 13, wherein in a case the mobile terminal is not able to connect to the image forming apparatus corresponding to the apparatus identification information, the mobile terminal is configured to display an image for prompting an operator to make a connection to an apparatus other than the image forming apparatus corresponding to the apparatus identification information.

16. The image forming apparatus according to claim 10, wherein the first application is App Clip or Instant Apps.

17. The image forming apparatus according to claim 10, wherein in a case the image forming apparatus is communicable, the image forming apparatus is able to execute image formation by the first application.

18. The image forming apparatus according to claim 17, wherein after the first application causes the image forming apparatus to execute the image formation, the mobile terminal is configured to issue a notification for prompting the user to install a second application, the second application being operable as an independent application in the mobile terminal by being installed into the mobile terminal.

* * * * *